(12) United States Patent
Asgarpour et al.

(10) Patent No.: US 10,174,809 B2
(45) Date of Patent: Jan. 8, 2019

(54) CHAIN ELEMENT AND METHOD FOR THE PRODUCTION THEREOF

(71) Applicant: Schaeffler Technologies AG & Co. KG, Herzogenaurach (DE)

(72) Inventors: Monir Asgarpour, Calais (FR); Christian Poiret, Coulogne (FR)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 210 days.

(21) Appl. No.: 15/385,346

(22) Filed: Dec. 20, 2016

(65) Prior Publication Data

US 2017/0102051 A1    Apr. 13, 2017

Related U.S. Application Data

(63) Continuation-in-part of application No. 14/428,806, filed as application No. PCT/EP2013/060710 on May 24, 2013.

(30) Foreign Application Priority Data

Sep. 21, 2012 (DE) .......................... 10 2012 217 025

(51) Int. Cl.
*B32B 9/00* (2006.01)
*F16G 13/06* (2006.01)
(Continued)

(52) U.S. Cl.
CPC .............. *F16G 13/06* (2013.01); *C23C 12/00* (2013.01); *C01B 32/914* (2017.08); *C01G 31/00* (2013.01);
(Continued)

(58) Field of Classification Search
None
See application file for complete search history.

(56) References Cited

U.S. PATENT DOCUMENTS 3,136,664 A     6/1964 Kuntzmann
7,695,575 B2 *  4/2010 Okumura ................ C23C 10/08
                                                         148/227
(Continued)

FOREIGN PATENT DOCUMENTS

CN     87104600      2/1988
CN     101109425    1/2008
(Continued)

OTHER PUBLICATIONS

"1 00Cr6", Worldwide Guide to Equivalent Irons and Steels, 2015, ASM International, 5th ed.
(Continued)

*Primary Examiner* — Seth Dumbris
(74) *Attorney, Agent, or Firm* — Volpe and Koenig, P.C.

(57) ABSTRACT

A chain element (2), in particular a chain pin (4), for joining at least two chain links (3), characterized in that it comprises a surface layer (5) containing boron and vanadium, formed by at least one step of diffusing boron and vanadium in the areas of the chain element (2) which are close to the surface. The surface layer (5) containing boron and vanadium is formed by boriding and subsequently vanadizing a substrate material having a carbon content of 0.60 wt.-% to 1.0 wt.-%.

16 Claims, 1 Drawing Sheet

(51) Int. Cl.
*C23C 12/00* (2006.01)
*C23C 8/68* (2006.01)
*C23C 28/00* (2006.01)
*C01G 31/00* (2006.01)
*C01B 32/914* (2017.01)

(52) U.S. Cl.
CPC ............... *C23C 8/68* (2013.01); *C23C 28/34* (2013.01); *Y10T 428/12576* (2015.01); *Y10T 428/12583* (2015.01); *Y10T 428/12951* (2015.01); *Y10T 428/24983* (2015.01); *Y10T 428/31678* (2015.04)

(56) References Cited

U.S. PATENT DOCUMENTS

| | | |
|---|---|---|
| 8,146,340 B2 | 4/2012 | Shimada et al. |
| 2006/0217224 A1 | 9/2006 | Girg et al. |
| 2008/0020879 A1 | 1/2008 | Nagao |
| 2008/0227575 A1 | 9/2008 | Fujiwara |
| 2011/0296873 A1 | 12/2011 | Derrig |
| 2011/0308227 A1 | 12/2011 | Hahn et al. |
| 2013/0086881 A1 | 4/2013 | Joergensen et al. |
| 2015/0233447 A1* | 8/2015 | Poiret ............... F16G 13/06 474/206 |

FOREIGN PATENT DOCUMENTS

| | | |
|---|---|---|
| CN | 101809317 | 8/2010 |
| EP | 1970596 | 9/2008 |
| JP | 2005290435 | * 10/2005 ............. C23C 10/36 |

OTHER PUBLICATIONS

"Ck75", Worldwide Guide to Equivalent Irons and Steels, 2015, ASM International, 5th ed.

Sen, Saduman, "The characterization of vanadium boride coatings on AISI 8620 steel", Sep. 2004, Surface & Coatings Technology, vol. 190, pp. 1-6.

* cited by examiner

CHAIN ELEMENT AND METHOD FOR THE PRODUCTION THEREOF

INCORPORATION BY REFERENCE

The following document is incorporated herein by reference as if fully set forth: U.S. patent application Ser. No. 14/428,806, filed Mar. 17, 2015.

BACKGROUND

The present application relates to a chain element that is constructed as a chain or as part of such a chain, e.g., as a chain pin, which is used, in particular, in chain drives. The application also relates to a method for the production of such a chain element or part.

FIELD OF THE INVENTION

Chain elements according to the class are used, e.g., as chain drives or parts of corresponding chain drives for transmitting forces and are used in a number of different fields of technology, for example, in the field of automotive engineering.

Chain elements are typically formed from steels that can receive particularly large mechanical loads due to the high mechanical loads that prevail during operation. It is further known to provide chain elements, especially in areas contacting other chain elements or other components, with a surface modification that influences the mechanical properties, in particular, surface hardening, which is to be understood as a wear-resistant coating that is stable with respect to corrosive media. A corresponding surface modification, that is, in particular, the formation of a special surface layer, can be used, for example, to impart a changed property spectrum to the substrate material forming the chain element in the area of its surface. For example, a material, especially a steel, can be provided with a certain strength and tenacity with an especially wear-resistant and corrosion-stable surface layer and in this way can be changed in a targeted manner in its mechanical properties. Known methods for modifying the surface of steels, that is, for forming corresponding surface layers, are, for example, case hardening (carbonization), nitriding, and/or the application of coatings based on titanium or molybdenum.

However, the surface layers formed by corresponding processes are not satisfactory or only conditionally satisfactory with regard to the particularly wear-intensive and optionally also corrosive conditions in the field of application of corresponding chain elements that are produced, e.g., by contamination with lubricants or lubricant residues or combustion residues of internal combustion engines, for the later application.

SUMMARY

The invention is based on the objective of providing a chain element that is improved, in particular, with regard to wear resistance and corrosion resistance.

To meet this objective, for a chain element of the type named above, the chain element comprises a surface layer that contains boron and vanadium and is formed by diffusion of boron and vanadium into areas of the chain element that are close to a surface thereof. The surface layer containing the boron and the vanadium is formed by a boriding process and a subsequent vanadizing process. The surface layer containing the boron and the vanadium is divided into at least first and second surface layer sections, the first surface layer section is directly adjacent to a substrate material of the chain element and consists essentially of boron vanadium compounds. The substrate material of the chain element has a carbon content of 0.60 wt.-% to 1.0 wt.-%. The second surface layer section is adjacent to the first surface layer section and consists essentially of substoichiometric crystalline vanadium carbide $VC_{1-x}$, wherein $x=0.65$ to 0.9, and any carbon within the vanadium carbide is derived from the carbon content of the substrate material. It is provided according to the invention that the chain element has a surface layer that contains boron and vanadium, that is, in particular, boron-vanadium compounds, e.g., VB and/or $V_2B$, formed by diffusion of boron (B) and vanadium (V) into areas of the chain element close to the surface.

Due to a relatively high level of carbon, the substrate material promotes diffusion of carbon into the surface layer during the boriding and vanadizing steps. The diffusion of carbon into the surface layer improves the mechanical strength of the surface layer. The high carbon content of the substrate material also results in vanadium carbide being formed in the surface layer, wherein especially the second surface layer section consists essentially of substoichiometric crystalline vanadium carbide $VC_{1-x}$, wherein $x=0.65$ to 0.9, after the boriding and vanadizing steps.

A micro hardness of the vanadium carbide depends on the carbon content of the substrate material. For a steel substrate, increasing the steel carbon content results in an increase of the thickness and micro hardness of the surface layer. By increasing the steel carbon content, the homogeneity of the substoichiometric vanadium carbide $VC_{1-x}$ increases. The wear performance of the surface layer increases with increasing the micro hardness and homogeneity of the substoichiometric vanadium carbide $VC_{1-x}$. Steel carbon content increased up to about 0.8 wt.-% shows a positive effect on the wear of the chain element. A further increase of the steel carbon content may produce micro cracks within the second surface layer. The most preferable carbon content for this process is in the range of 0.6 wt.-% to 0.8 wt.-%.

The chain element according to the invention has an improved characteristics profile due to the surface layer containing boron and vanadium formed by diffusion of boron and vanadium into areas of the chain element adjacent to the surface. Due to the formation of the surface layer containing boron and vanadium, the chain element according to the invention has wear resistance, overrun resistance, etc., both with regard to its mechanical properties, in particular, surface hardness, wherein regularly sufficient ductility is further guaranteed, and also has corrosion resistance relative to corrosive media, that is, in particular, the lubricants named above, in particular, degraded lubricating oils or lubricating greases, and has an excellent characteristics profile.

Consequently, the chain element according to the invention can be used, e.g., without any additional means, in the regularly mechanically and also corrosively high load operating conditions as part of the drive train of modern motor vehicles, where it is distinguished by its improved service life in comparison with conventional chain elements. This is based, in particular, on the previously mentioned high wear resistance with respect to the abrasive particles produced during the operation of the motor vehicle and also originating from components of the drive train due to wear and also the increased corrosion resistance relative to the corrosive environment caused by degraded lubricating agents around the surface layer containing boron and vanadium in the chain element according to the invention.

Because the surface layer containing boron and vanadium is constructed only in the areas of the chain element according to the invention close to the surface, the rest of the substrate material forming the chain element according to the invention, or its basic structure, remains unchanged in its properties, wherein this substrate material usually involves a steel, e.g., SAE 1010, SAE 1012, SAE 8620, DIN 16MnCr5. The substrate material is preferably a material, i.e., in particular, a steel with a carbon content of 0.60 to 0.8 wt.-%. The substrate material forming the chain element could also be formed, for example, from steels of type CK75 or 100Cr6.

The surface layer containing boron and vanadium can be theoretically separated from the other material of the chain element such that this layer has a higher percentage of boron and vanadium or boron and vanadium compounds in comparison with the substrate material forming the chain element, which can be shown, e.g., using polished micrograph sections.

What is to be understood according to the invention as an area of the chain element that is close to the surface can be similarly explained, namely that area of the surface of the chain element in which the surface layer containing the boron and vanadium is formed.

The surface layer containing boron and vanadium is formed according to the invention by the diffusion of boron and vanadium in areas of the chain element that are close to the surface. Consequently, as a function of the actually selected and used process parameters, e.g., temperature, pressure, duration, etc., in the scope of the measure for the diffusion of boron and vanadium into areas of the chain element that are close to the surface, a specific effect can be realized on the surface layer that is to be formed or is already formed and that contains boron and vanadium in the chain element. In particular, the penetration depth of the boron and/or vanadium atoms or boron and vanadium compounds, as well as the concentration of the boron and/or vanadium atoms and boron and vanadium compounds in the surface layer containing boron and vanadium can be influenced or controlled in a process-specific way.

As is still to be explained below, the surface layer containing boron and vanadium, that is, in particular, boron-vanadium compounds, e.g., VB or $V_2B$, can be formed, in particular, by means of thermochemical methods for the diffusion of boron and vanadium, that is, for the diffusion of boron and vanadium atoms, as well as optionally boron and vanadium compounds in areas of the chain element close to the surface.

As a corresponding measure for the diffusion of boron and vanadium into areas of the chain element that are close to the surface, in particular, thermochemical treatments of the chain element are used, that is, the diffusion of boron and vanadium for forming the surface layer containing boron and vanadium advantageously involves a thermochemical treatment, such as boriding, and subsequent vanadizing of the chain element.

The surface layer containing boron and vanadium can be divided, due to its production by means of boriding and subsequent vanadizing, into at least two surface layer sections, wherein a first surface layer section is directly adjacent to the substrate material of the chain element and consists essentially from boron-vanadium compounds and a second surface layer section essentially made from vanadium adjacent to the first surface layer section. This can be explained by the vanadizing following the boriding during the production of the surface layer containing boron and vanadium, wherein vanadium diffuses into a surface layer containing essentially boron formed by the boriding, wherein a surface layer section containing boron and vanadium or boron-vanadium compounds is formed, adjacent to which another surface layer section containing essentially vanadium is formed. Both surface layer sections form the surface layer containing boron and vanadium in the chain element according to the invention. During boriding and vanadizing the substrate surface, carbon contained in the substrate diffuses towards the substrate surface and reacts with vanadium, wherein substoichiometric crystalline $VC_{1-x}$ (x=0.65-0.9) is formed.

The surface layer containing boron and vanadium has, e.g., a hardness of 2000-3500 HV (Vickers hardness), in particular, greater than 3000 HV. The high hardness of the surface layer containing boron and vanadium makes a considerable contribution to the improved wear resistance of the chain element according to the invention. Obviously, the surface layer containing boron and vanadium can also be below 2000 HV or above 3500 HV in exceptional cases.

The surface layer containing boron and vanadium has, for example, a layer thickness of 10 to 350 µm, preferably from 100 to 300 µm, especially preferred from 150 to 250 µm. As mentioned, the layer thickness can be influenced, in particular, by selecting and adjusting the process parameters used in the scope of forming the surface layer containing boron and vanadium. Obviously, the layer thickness of the surface layer containing boron and vanadium can also be below 10 µm and above 350 µm. The second surface layer of the chain element preferably has a layer thickness in the range of 9 to 16 µm. Preferably, the surface layer contains a maximum boron concentration of 1 at-%. The surface layer of the chain element may contain alumina particles having a maximum particle size of 10 µm being present in a maximum concentration of 1 at-%.

The chain element according to the invention is, in particular, a chain pin for connecting at least two chain links of a chain. Chain pins are usually highly loaded components of a chain, so that the formation according to the invention of a surface layer containing boron and vanadium formed by the diffusion of boron and vanadium into areas of the chain pin that are close to the surface is especially preferred.

In principle, all of the designs for the chain element according to the invention apply analogously to the chain pin according to the invention.

In addition, the invention relates to a method for producing a chain element, in particular, a chain pin for connecting at least two chain links, with a surface layer containing boron and vanadium, characterized by the steps of preparing the chain element and performing the diffusion of boron and vanadium into areas of the chain element that are close to the surface for forming the surface layer containing boron and vanadium.

Here, preferably a thermochemical boriding and a subsequent thermochemical vanadizing of the chain element are performed for the diffusion of boron and vanadium into areas of the chain element that are close to the surface for forming the surface layer containing boron and vanadium.

Boriding is generally a method for introducing boron into the surface of a workpiece. Here, a diffusion of powdery or paste-like boron applied on the surface of the workpiece for the boriding process is performed at elevated temperatures, that is, in particular, at temperatures above 800° C., in particular, between 850 and 1050° C. Typically, a boride layer, in particular, with a columnar shape of cristallites, forms on workpieces that are based on iron.

In the scope of the performance of the method according to the invention, the vanadizing that follows the boriding that leads to the formation of a surface layer section containing essentially boron or boron compounds is generally a method for introducing vanadium into the surface of a workpiece. Similar to the boriding process, here a powder containing vanadium or vanadium compounds or a paste containing vanadium or vanadium compounds is applied to the surface of the workpiece for the vanadizing process, wherein at elevated temperatures vanadium or vanadium compounds penetrate into the workpiece and form a surface layer containing vanadium or vanadium compounds.

The vanadizing process following the boriding process is essential for this preferred construction of the method according to the invention for forming the surface layer containing boron and vanadium. As explained above with respect to the chain element according to the invention, the surface layer containing boron and vanadium can be theoretically divided into at least two surface layer sections, due to its formation by means of boriding and then vanadizing, wherein a first surface layer section is directly adjacent to the substrate material of the chain element and consists essentially of boron vanadium compounds and a second surface layer section adjacent to the first surface layer section consists essentially of vanadium carbide. This can be explained by the vanadizing process following the boriding process during the production of the surface layer containing boron and vanadium, wherein vanadium or vanadium compounds diffuse, due to the vanadizing process, into a surface layer containing essentially boron formed by the boriding process, wherein a surface layer section containing boron and vanadium or boron vanadium compounds is formed, adjacent to which another surface layer section containing essentially vanadium or vanadium compounds is formed. Both surface layer sections form the surface layer containing boron and vanadium in the chain element according to the invention.

The thermochemical treatment of the chain element, that is, in particular, the thermochemical boriding and the thermochemical vanadizing following this boriding process, can each be performed in a temperature range from 800 to 1200° C., in particular, between 850 and 1050° C. It is conceivable to perform the vanadizing directly after the honking or to allow the chain element to cool down between the boriding and vanadizing processes. Obviously the mentioned temperatures can also be increased or decreased in exceptional cases.

It is possible that the thermochemical treatment is performed for a duration of 2 to 24 hours, in particular, 4 to 16 hours. By means of the duration of the thermochemical treatment, that is, in particular, the duration for the boriding and the duration for the vanadizing following this honking, influence that is specific to the process can be realized on the properties, e.g., hardness, penetration depth, homogeneity, etc. of the surface layer containing boron and vanadium. Obviously, in exceptional cases, the thermochemical treatments can also be performed with shorter or longer durations than the mentioned times.

Forming the surface layer containing boron and vanadium is advantageously performed such that a surface layer containing boron and vanadium is formed with a layer thickness of 10 to 350 µm, preferably from 100 to 300 µm, especially preferred from 150 to 250 µm. In exceptional cases, forming the surface layer containing boron and vanadium can also be performed such that corresponding layer thicknesses less than 10 µm or greater than 350 µm can also be formed.

In principle, all of the configurations for the method according to the invention for producing a chain element with a surface layer containing boron and vanadium apply analogously to the chain element according to the invention and also to the chain pin according to the invention.

BRIEF DESCRIPTION OF THE DRAWINGS

One embodiment of the invention is shown in the drawing and will be described in more detail below. Shown are.

DETAILED DESCRIPTION OF THE PREFERRED EMBODIMENTS

Figure 1:
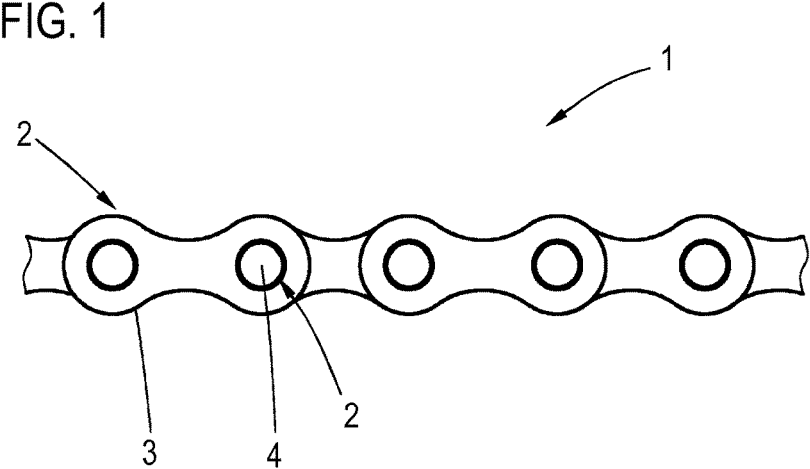
FIG. 1 shows a characteristic section of a chain comprising multiple chain elements.

FIG. 1 shows a characteristic section of a chain 1 comprising multiple chain elements 2. The chain 1 can be constructed as a toothed chain and used, for example, for transmitting force in the drive train or as part of the drive train of a motor vehicle.

Figure 2:
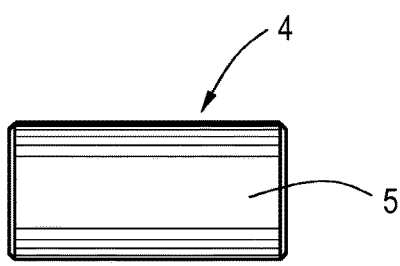
FIG. 2 shows a chain element in the form of a chain pin for connecting at least two chain links of a chain.

Clearly the chain 1 comprises multiple chain elements 2 in the form of chain links 3, in particular, clip-shaped links, which are arranged one after the other and are connected to each other by chain pins 4. FIG. 2 shows a separate representation of a chain element 2 in the form of a chain pin 4 for connecting at least two chain links 3 of a chain 1.

The chain elements 2 forming the chain 1, that is, the chain links 3 and the chain pins 4, are formed from a metallic substrate material 8, in particular, a steel having a carbon content of 0.6 wt. % to 0.8 wt. %, e.g. CK75 or 100Cr6. The surface of the chain elements 2 or a part of the chain elements 2 has been subjected to a thermochemical surface treatment in the form of forming a surface layer 5 containing boron and vanadium.

Specifically, the chain elements 2 are first subjected to boron diffusion by means of boriding and then to vanadium diffusion by means of vanadizing. After the boriding, a surface layer containing boron or boron compounds is formed, from which a surface layer is formed that contains boron and vanadium, that is, in particular, boron vanadium compounds, such as VB and/or $V_2B$, due to the vanadizing and the associated diffusion of vanadium.

Figure 3:
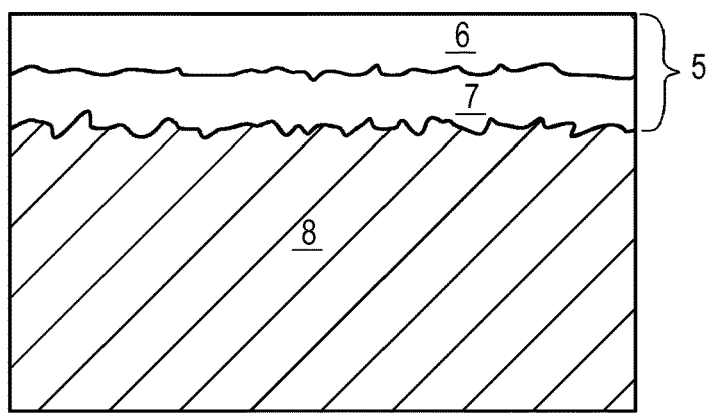
FIG. 3 shows an enlargement of the surface layer containing boron and vanadium shown in FIGS. 1 and 2.

As can be seen in FIG. 3, the surface layer 5 containing boron and vanadium can have a surface layer section 6 that contains essentially substoichiometric vanadium carbide and is formed by the vanadizing process, wherein this surface layer section 6 is formed on the surface layer section 7 containing boron and vanadium, that is, essentially boron vanadium compounds. Both surface layer sections 6, 7 are part of the surface layer 5 containing boron and vanadium.

In one embodiment, the metallic substrate material 8 has a carbon content of 0.6 wt. % to 1.0 wt. %. Due to this relatively high level of carbon, the metallic substrate material 8 promotes diffusion of carbon into both surface layer sections 6, 7 during the boriding and vanadizing steps. The diffusion of carbon into the surface layers sections 6, 7 improves the mechanical strength of the surface layers 5. The high carbon content of the metallic substrate material 8 also results in vanadium carbide being formed in the surface layer 5 after the boriding and vanadizing steps.

A micro hardness of the vanadium carbide depends on the carbon content of the substrate material. For a steel substrate material 8, increasing the steel carbon content results in an increase of the thickness and micro hardness of the surface layer 5. By increasing the steel carbon content, the homogeneity of the substoichiometric vanadium carbide $VC_{1-x}$ increases. The wear performance of the surface layer 5 increases with increasing the micro hardness and homogeneity of the substoichiometric vanadium carbide $VC_{1-x}$ (x=0.65-0.9). The most preferable carbon content of the substrate material 8 for this process is in the range of 0.6 wt.-% to 0.8 wt.-%.

The surface layer 5 containing boron and vanadium has a layer thickness of approx. 250 μm. This thickness can be divided approx. 100 μm to the surface layer section 6 containing essentially vanadium and approx. 150 μm to the surface layer section 7 containing essentially boron and vanadium, that is, essentially boron vanadium compounds.

The surface layer 5 containing boron and vanadium imparts an improved characteristics profile to the chain element 2, wherein, in particular, the wear resistance and the corrosion resistance are improved due to the high hardness in the range of approx. 3000 HV (Vickers hardness) of the surface layer 5 containing boron and vanadium, along with sufficient ductility.

The production of a chain element 2, in particular, a chain pin 4 for connecting at least two chain links 3, with a surface layer 5 containing boron and vanadium, is performed by means of a method with the steps of preparation of the chain element 2 and the diffusion of boron and vanadium into areas of the chain element 2 that are close to the surface for forming the surface layer 5 containing boron and vanadium.

As a measure for the diffusion of boron and vanadium into areas of the chain element 2 that are close to the surface, preferably a thermochemical boriding process and a thermochemical vanadizing process subsequent to this boriding process are performed on the chain element 2.

The thermochemical boriding and also the thermochemical vanadizing of the chain element 2 are performed, e.g., at temperatures in the range from approx. 900° C. for a duration of approx. 4 hours, so that a homogeneous surface layer 5 containing boron and vanadium is formed with the specified layer thickness of approx. 250 μm.

LIST OF REFERENCE NUMBERS

1 Chain
2 Chain element
3 Chain link
4 Chain pin
5 Surface layer
6 Surface layer section
7 Surface layer section
8 Substrate material

The invention claimed is:

1. A chain element, comprising a surface layer that contains boron and vanadium and is formed by diffusion of boron and vanadium into areas of the chain element that are close to a surface thereof, the surface layer containing the boron and the vanadium is formed by a boriding process and a subsequent vanadizing process, wherein the surface layer containing the boron and the vanadium is divided into at least first and second surface layer sections, the first surface layer section is directly adjacent to a substrate material of the chain element and consists essentially of boron vanadium compounds, the substrate material of the chain element has a carbon content of 0.60 wt. % to 1.0 wt. %, and the second surface layer section is adjacent to the first surface layer section and consists essentially of substoichiometric crystalline vanadium carbide $VC_{1-x}$, wherein x=0.65 to 0.9, and wherein any carbon within the vanadium carbide is derived from the carbon content of the substrate material.

2. The chain element according to claim 1, wherein the surface layer containing the boron and the vanadium has a hardness of 2000-3500 HV.

3. The chain element according to claim 1, wherein the surface layer containing the boron and the vanadium has a layer thickness from 10 to 350 μm.

4. The chain element according to claim 1, wherein the second surface layer has a layer thickness from 9 to 16 μm.

5. The chain element according to claim 1, wherein the surface layer contains a maximum boron concentration of 1 at-%.

6. The chain element according to claim 1, wherein the surface layer contains alumina particles having a maximum particle size of 10 μm being present in a maximum concentration of 1 at-%.

7. A chain pin for connecting at least two chain links of a chain, said chain pin comprises a surface layer that contains boron and vanadium and is formed by diffusion of the boron and the vanadium into areas of the chain pin that are close to a surface thereof, the surface layer containing the boron and the vanadium is formed by a boriding process and a subsequent vanadizing process, wherein the surface layer containing the boron and the vanadium is divided into at least first and second surface layer sections, the first surface layer section is directly adjacent to a substrate material of the chain pin, the substrate material of the chain pin has a carbon content of 0.60 wt. % to 1.0 wt. %, and the second surface layer section that is adjacent to the first surface layer section consists essentially of substoichiometric crystalline vanadium carbide wherein x=0.65 to 0.9, and wherein any carbon within the vanadium carbide is derived from the carbon content of the substrate material.

8. The chain pin according to claim 7, wherein the surface layer containing the boron and the vanadium has a hardness of 2000-3500 HV.

9. The chain pin according to claim 7, wherein the surface layer containing the boron and the vanadium has a layer thickness from 10 to 350 μm.

10. The chain pin according to claim 7, wherein the second surface layer has a layer thickness from 9 to 16 μm.

11. The chain pin according to claim 7, wherein the surface layer contains a maximum boron concentration of 1 at-%.

12. The chain pin according to claim 1, wherein the surface layer contains alumina particles having a maximum particle size of 10 μm being present in a maximum concentration of 1 at-%.

13. A method for the production of a chain element, with a surface layer containing boron and vanadium, comprising the steps:
preparing the chain element,
diffusing boron and vanadium into areas of the chain element that are close to a surface thereof for construction of the surface layer containing the boron and the vanadium,
performing a thermochemical boriding process and a subsequent thermochemical vanadizing process of the chain element, such that the surface layer containing the boron and the vanadium is divided into at least first and second surface layer sections, the first surface layer section is directly adjacent to a substrate material of the chain element and consists essentially of boron vanadium compounds, the substrate material of the chain pin has a carbon content of 0.60 wt. % to 1.0 wt. %, and the second surface layer section that is adjacent to the first surface layer section consists essentially of substoichiometric crystalline vanadium carbide $VC_{1-x}$, wherein x=0.65 to 0.9, and wherein any carbon within the vanadium carbide is derived from the carbon content of the substrate material.

14. The method according to claim 13, further comprising performing the thermochemical treatment in a temperature range from 800 to 1200° C.

15. The method according to claim 13, further comprising performing the thermochemical treatment for a duration of 2 to 24 hours.

16. The method according to claims 13, wherein the measure for the construction of the surface layer containing boron and vanadium is performed such that the surface layer containing boron and vanadium is constructed with a layer thickness of 10 to 350 μm.

* * * * *